US008045940B2

(12) United States Patent  
Gohn et al.

(10) Patent No.: US 8,045,940 B2
(45) Date of Patent: Oct. 25, 2011

(54) INTEGRATED CIRCUIT AND METHOD FOR RECEPTION OF RADIO FREQUENCY SIGNALS

(75) Inventors: Muriel Gohn, Frederiksberg C (DK); Thomas Gerner Noergaard, Rungsted (DK); Dennis Olesen, Kirke Hyllinge (DK)

(73) Assignee: Alcatel Lucent, Paris (FR)

( * ) Notice: Subject to any disclaimer, the term of this patent is extended or adjusted under 35 U.S.C. 154(b) by 816 days.

(21) Appl. No.: 12/037,497

(22) Filed: Feb. 26, 2008

(65) Prior Publication Data

US 2008/0207154 A1    Aug. 28, 2008

(30) Foreign Application Priority Data

Feb. 27, 2007 (EP) ..................... 07290252

(51) Int. Cl.
   *H04B 7/08* (2006.01)
   *H04B 1/06* (2006.01)
   *H04B 7/00* (2006.01)
   *H04B 1/28* (2006.01)
(52) U.S. Cl. ..................... 455/130; 455/132; 455/252.1; 455/333
(58) Field of Classification Search ............... 455/553.1, 455/132, 136, 138, 232.1, 234.2, 245.1–245.2, 455/249.1, 250.1–253.2, 333
   See application file for complete search history.

(56) References Cited

U.S. PATENT DOCUMENTS

| 7,260,370 | B2 * | 8/2007 | Wang et al. ............ 455/135 |
| 7,457,617 | B2 * | 11/2008 | Adams et al. .......... 455/418 |
| 7,587,222 | B2 * | 9/2009 | Trachewsky et al. ..... 455/553.1 |
| 7,747,234 | B2 * | 6/2010 | Behzad .................. 455/136 |
| 7,778,618 | B2 * | 8/2010 | Lu et al. ................ 455/234.2 |
| 2003/0228852 | A1 * | 12/2003 | Murakami et al. ....... 455/127.3 |
| 2003/0235167 | A1 | 12/2003 | Kuffner |
| 2004/0022215 | A1 * | 2/2004 | Okuhata et al. ........ 370/334 |
| 2006/0009177 | A1 * | 1/2006 | Persico et al. .......... 455/143 |
| 2006/0171492 | A1 * | 8/2006 | Behzad et al. .......... 375/343 |

FOREIGN PATENT DOCUMENTS

WO  WO 00/38339 A1   6/2000

* cited by examiner

*Primary Examiner* — Simon Nguyen
(74) *Attorney, Agent, or Firm* — Fay Sharpe LLP (57) ABSTRACT

An integrated circuit, IC, for reception of radio frequency; RF, signals in an antenna network system, the IC comprising:
  a plurality of amplifying paths to cover a plurality of radio frequency bandwidths or standards, each amplifying path comprising at least one low noise amplifier, at least one variable attenuator unit, and/or at least one gain flattening unit, each of the low noise amplifier, the attenuator unit, and the gain flattening unit being adapted to operate at a respective radio frequency bandwidth or standard;
  at least one control interface connected with at least one of the low noise amplifier, the attenuator unit, and the gain flattening unit on each amplifying path and adapted for communication with a digital processing unit to control operation of the at least one of the low noise amplifier, the attenuator unit, and the gain flattening unit.

20 Claims, 6 Drawing Sheets

INTEGRATED CIRCUIT AND METHOD FOR RECEPTION OF RADIO FREQUENCY SIGNALS

BACKGROUND OF THE INVENTION

The invention is based on the priority application EP 07290252.1 which is hereby incorporated by reference.

The present invention relates to an integrated circuit for reception of radio frequency signals in an antenna network system, to an antenna network circuit, to a method for reception of antenna signals, and to a base station for a cellular telecommunications system.

Antenna network circuits, as used for instance in base stations for cellular communication systems, comprise low noise amplifiers (LNA) boards for amplifying received radio frequency, RF, signals.

Existing LNA boards, in particular LNA boards for diversity (i.e., multiple parallel) reception of RF signals, are dedicated to a single specific frequency bandwidth or standard and use discrete components. In this way, a completely new development of the LNA board is required when changing equipment or when moving to a new bandwidth or standard. Moreover, the fact that known LNA boards are designed based on using discrete parts, e.g., a digital processing unit (CPU) and unitary components such as transistors, varactors, PIN diodes, resistors, capacitors and inductors, the part count and overall costs are high, especially if two identical structures are necessary for diversity reception, as required for instance by GSM. Furthermore, building up an LNA board from discrete parts requires considerable tuning and adjustments on board before a corresponding solution is ready for manufacturing. Due to their assembly from discrete parts, known LNA boards show an elevated consumption of both space and power, which presents an issue for the design of future equipment.

Alternatively, the Low Noise Amplifier function (LNA function) is designed by combining several transistor stages in a single full-custom module, i.e., dies wire-bond on a ceramic (i.e. alumina) substrate and other components assembled in a unique custom package. This is again a full custom design for on particular frequency and standard having the above-mentioned disadvantages.

OBJECT OF THE INVENTION

It is the object of the present invention to provide an integrated circuit for reception of radio frequency signals in an antenna network system as well as a method for antenna signal adaptation which allow to address multiple bandwidths or standards in order to cover a wide range of antenna system equipment while providing a significant cost reduction of the LNA function. Furthermore, integration of the LNA function in an antenna network architecture shall be simplified by reducing the part count and power dissipation.

SUMMARY OF THE INVENTION

According to a first aspect of the present invention the object is achieved by providing an integrated circuit for reception of radio frequency signals in an antenna network, the IC comprising: a plurality of amplifying paths to cover a plurality of radio frequency, RF, bandwidths or standards, each amplifying path comprising at least one low noise amplifier, at least one variable attenuator unit (or adjustable/variable gain element), and/or at least one gain flattening unit, each of the low noise amplifier, the variable attenuator unit, and the gain flattening unit being adapted to operate at a respective radio frequency bandwidth or standard; at least one control interface connected with at least one of the low noise amplifier, the variable attenuator unit, and the gain flattening unit in each amplifying path and adapted for communication with a digital processing unit to control operation of the at least one of the low noise amplifier, the variable attenuator unit, and the gain flattening unit.

In one embodiment of the integrated circuit in accordance with the present invention, to address said antenna network, two identical sets of amplifying paths or amplifying RF paths ('A' and 'B') are integrated in one chip for diversity reception of antenna signals. Alternatively, for ease of integration on board the chip may include only one set of amplifying paths, and the chip will be used twice for applications which require diversity reception. An advantage of this is to improve ASIC power dissipation, with reference to standard packaging, such as QFN package for instance.

According to a second aspect of the present invention the object is achieved by providing an antenna network circuit comprising the integrated circuit according to said first aspect of the present invention in connection with a first amplifier stage having at least one low noise amplifier, said first amplifier stage being connected with the integrated circuit so that the low noise amplifier of the first amplifier stage is connected with an active one of the amplifying paths in the integrated circuit.

According to a third aspect of the present invention the object is achieved by providing a method for reception of antenna signals, the method comprising: receiving a radio frequency, RF, antenna signal; selectively providing said RF antenna signal to one of a plurality of amplifying paths, each of said amplifying paths covering a dedicated RF bandwidth or standard and comprising at least one low noise amplifier, at least one variable attenuator unit, and/or at least one gain flattening unit, each of the low noise amplifier, the variable attenuator unit, and the gain flattening unit being operated at a respective RF bandwidth or standard and implemented inside an integrated circuit; and controlling gain and/or flatness of the amplifying path by means of a digital processing unit through at least one control interface.

According to a fourth aspect of the present invention the object is achieved by providing a base station for a cellular telecommunications system, the base station comprising an antenna network circuit according to said second aspect of the present invention.

Preferred embodiments of various aspects of the present invention are comprised in the dependent claims, the wording of which is herewith incorporated by reference in the present description to avoid unnecessary repetition of text.

By means of embodiments in accordance with the present invention, multiple bandwidths for covering a wide range of (diversity) antenna systems equipment can be addressed with a single LNA integrated circuit or module which may include the complete electronics for digital control, thus providing a significant cost reduction of the LNA function. Furthermore, embodiments of the present invention add flexibility to various antenna systems by re-using the same part reference for new equipment and/or a new frequency bandwidth or standard. Furthermore, the present invention achieves reduction of the part count and power dissipation.

Embodiments of the present invention, in particular embodiments comprising an additional first amplifier stage connected with the integrated circuit, can be easily adapted with respect to their RF performance to match the constraints of the antenna system, e.g., very low noise, variable gain over a wide range, high linearity capability (e.g., IP3), while supporting as many integrated LNAs as required for covering different frequency bandwidths or standard. Said bandwidths or standard include (without limitation) AMPS, EGSM, DCS, PCS, UMTS, etc. Embodiments in accordance with the present invention are also well suited to address different bands of WIMAX (Worldwide Interoperability for Microwave Access). Using a suitable design of amplifying paths, embodiments of the integrated circuit or the antenna network circuit in accordance with the present invention are able to integrate WIMAX bands in conjunction with, e.g., UMTS.

For supporting one dedicated application standard, the associated amplifying path is powered up by means of a corresponding control command issued by the digital processing unit, e.g., for powering up the associated LNA on said amplifying path which may also be referred to as "active" amplifying path. In order to reduce power consumption, the other LNAs (on different amplifying paths) are kept in power down mode. A dedicated application program as well as necessary application data is downloaded to a memory section of the digital processing unit. According to embodiments of the present invention, said memory unit or memory section can be arranged either internally or externally of the integrated circuit. According to an embodiment of the present invention, the digital processing unit is comprised within the integrated circuit. In this case, for reasons of manufacturing and cost reduction, said memory section or memory unit is preferably located externally of the integrated circuit.

According to further embodiments of the present invention, said memory unit can be devised as a flash memory. However, the present invention is not limited to such an embodiment of the memory unit which generally may take on the form of any Electrically Erasable Programmable Read-Only Memory (EEPROM).

The digital processing unit as used in embodiments of the present invention is able to handle gain tuning and flattening performed by the various elements on an active amplifying path (i.e., LNA, variable attenuator, gain flattening unit) and to manage additional system requests, such as alarm, gain and signalling status, requests for hardware type, software version, etc.

In accordance with further embodiments of the present invention the integrated circuit includes a temperature sensor for providing temperature data to the digital processing unit. Correspondingly, the digital processing unit is able to process temperature data provided by the temperature sensor for compensating temperature effects and may thus adjust gain on said amplifying paths by suitably controlling the corresponding variable attenuator.

In accordance with further embodiments of the present invention the integrated circuit is designed to match with requirements for outdoor equipment, i.e., to cover a temperature range from −55° C. to +85° C.

As already stated above, in accordance with embodiments of the present invention the integrated circuit may be preceded by a further LNA stage (hereinafter also referred to as "on-board" LNA stage) to achieve optimum performance. Keeping an on-board LNA stage in combination with an integrated amplifying path has the advantage that different manufacturing technologies can be used for providing the on-board LNA stage on one hand and the integrated amplifying path (or amplification stage) on the other hand. For instance, GaAs technology may be used in connection with the on-board LNA stage while elements on the integrated amplifying path can be realised using BiCMOS technology based on SiGe. This may further enhance the cost effectiveness of the proposed solution.

In accordance with embodiments of the present invention, there are two main possible approaches for defining the integrated circuit or LNA module:

According to a first approach, the integrated circuit may be designed as a mixed signal or mixed-mode application specific integrated circuit (ASIC) including—on each amplifying path—a variable gain amplifier with high linearity and reasonable noise figure as well as the digital processing unit and the temperature sensor ("all-in-one" approach). This architecture may require an external memory unit, e.g., an external flash memory, to store the data and application program dedicated to the application standard being used. As already stated above, due to the noise figure constraints on LNA inputs, embodiments using this approach may include an external LNA stage.

In accordance with the second approach, embodiments of the integrated circuit in accordance with the present invention take on the form of a multi-chip design including at least one dedicated (packaged) RF chip for providing the LNA function in connection with a digital processing unit (CPU) and a temperature sensor. In a further embodiment based on this approach, the RF chip or die as well as dies for the digital processing unit and the temperature sensor may be combined in a small ceramic to realise a single multi-chip module (MCM) for easy integration.

In accordance with the general concept underlying the present invention, in both approaches the proposed integrated circuit or module can be used to design either a GSM or a DCS or a PCS or a UMTS equipment without any architectural changes. As will be appreciated by a person skilled in the art, the present invention is by no means limited to the above-mentioned standards. A corresponding amplifying path selection and execution of application programs will be operated by means of the digital processing unit.

In this way, the present invention achieves a reduced part count in connection with improved system compactness and presents a building block that can be used with multiple frequency standards. This leads to a greatly reduced development schedule resulting in a significant reduction of product costs.

Further advantages and characteristics of the present invention can be gathered from the following description of preferred embodiments given by way of example only with reference to the enclosed drawings. Features mentioned above as well as below can be used in accordance with the present invention either individually or in conjunction. The following description is not to be regarded as an exhaustive enumeration but rather as examples with respect to a general concept underlying the present invention.

DETAILED DESCRIPTION

Figure 1:
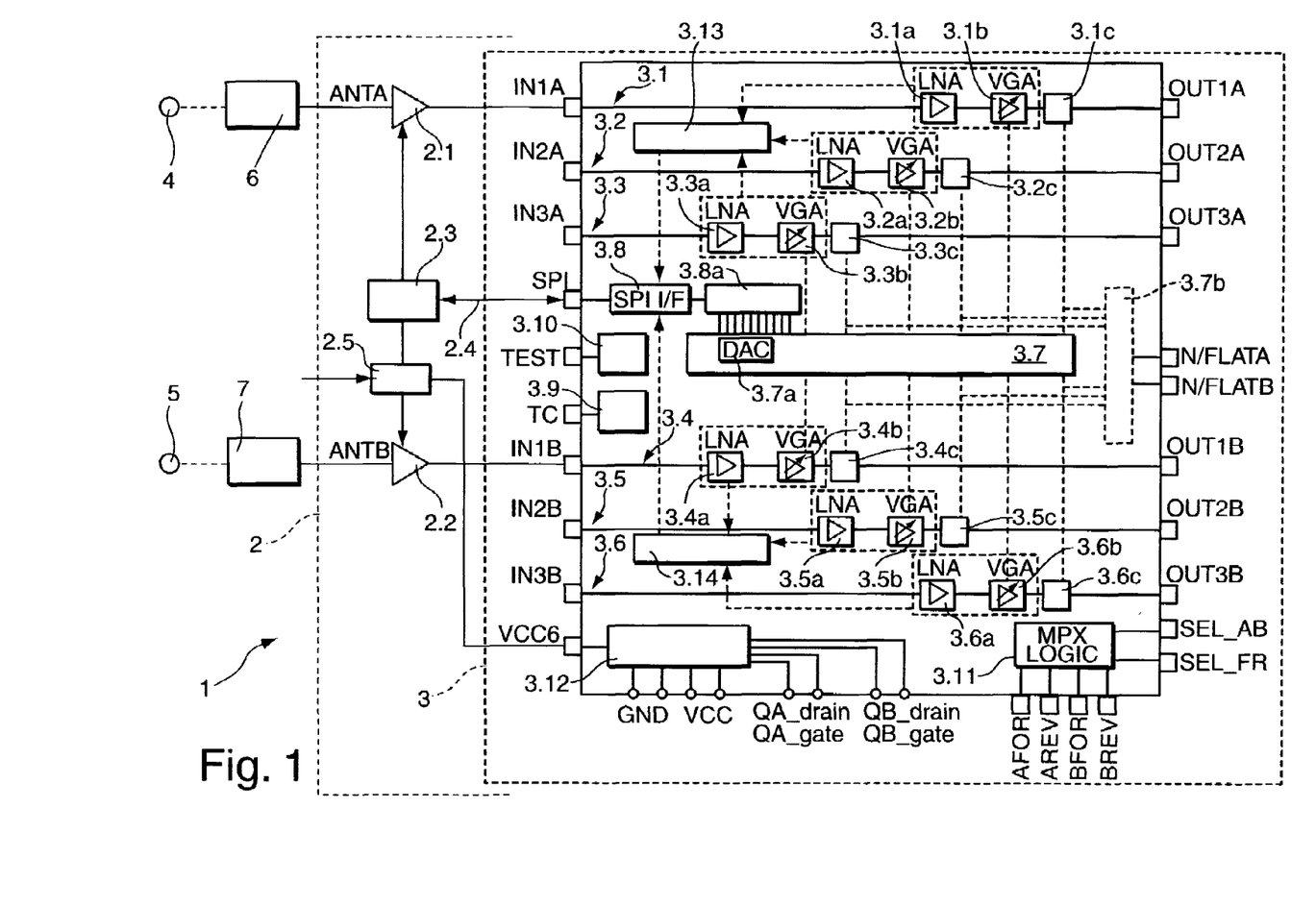
FIG. 1 is a schematic diagram of an antenna network circuit in accordance with the present invention comprising an embodiment of the integrated circuit according to the present invention.

FIG. 1 shows a schematic diagram of an antenna network circuit in accordance with the present invention comprising an embodiment of the integrated circuit according to the present invention. Antenna network circuit 1 generally comprises a low noise amplifier (LNA) board 2, on which is arranged an application-specific integrated circuit (ASIC) 3 which in the present document is also referred to as "integrated circuit". In the embodiment of FIG. 1, the low noise amplifier board 2 and the ASIC 3 are illustrated by means of respective boxes with dashed lines. LNA board 2 comprises two low noise amplifiers (LNA) 2.1, 2.2 arranged in parallel. For diversity reception of radio frequency (RF), signals, each of LNAs 2.1, 2.2 is coupled with a corresponding antenna 4, 5 via a respective diplexer filter 6, 7. Diplexer filter 6, 7 are devised as pass-band filters and provide selectivity between receive (Rx) and transmit (Tx) frequency bands. An output of LNAs 2.1, 2.2 is connected with ASIC 3, the configuration of which will now be described in more detail.

ASIC 3 comprises a plurality of amplifying paths 3.1-3.6 to cover a plurality of RF bandwidths or standards, in particular ranging from 800 MHz up to and above 3 GHz in cellular applications, comprising but not limited to AMPS, EGSM, DCS, PCS, UMTS, WIMAX, etc. Each amplifying path 3.1-3.6 comprises an LNA 3.*xa* (x=1, . . . ,6) followed by a variable attenuator unit 3.*xb* being either an active attenuator unit in the form of a variable gain amplifier (VGA) or an adjustable attenuator, and a gain flattening unit 3.*xc*. Each of the LNA 3.*xa*, the attenuator unit 3.*xb* and the gain flattening unit 3.*xc* on each amplifying path 3.1-3.6 are adapted to operate at a respective radio frequency bandwidth or standard associated with a given amplifying path 3.1-3.6.

It should be noted that for reasons of diversity reception, which is mandatory for certain standards such as GSM, ASIC 3 comprises two parallel amplifying paths 3.1, 3.4; 3.2, 3.5; 3.3, 3.6; for each of said plurality of RF bandwidths or standards. In this way, amplifying paths 3.1 and 3.4 are dedicated to the same RF bandwidth or standard, amplifying paths 3.2 and 3.5 are dedicated to the same RF bandwidth or standard, and amplifying paths 3.3 and 3.6 are dedicated to the same RF bandwidth or standards. Active amplifying paths 3.1, 3.4 of ASIC 3, i.e., amplifying paths which are actually used for reception of RF signals in antenna network circuit 1, are operatively connected with a respective output of LNAs 2.1, 2.2. In the embodiment of FIG. 1, amplifying paths 3.1 and 3.4 are active amplifying paths and are operatively connected with LNA 2.1 and LNA 2.2, respectively.

Furthermore, ASIC 3 comprises a number of control interfaces for controlling operation of at least some of said elements 3.*xa*, 3.*xb*, 3.*xc* on amplifying paths 3.1-3.6. A first control interface 3.7 is devised as a decoder/multiplexer and is connected with the VGA 3.*xb* and the flattening unit 3.*xc* of each amplifying path 3.1-3.6 to control operation thereof, e.g., power on, temperature compensation, gain and flattening control. The first control interface 3.7 is operatively connected with a digital processing unit (CPU) 2.3 comprised on LNA board 2 via Serial Peripheral Interface (SPI) bus 2.4, SPI interface 3.8, and register 3.8*a*. The first control interface 3.7 further comprises a digital-to-analog converter 3.7*a* for converting digital control signals received from CPU 2.3 into analog control signals for controlling said elements on amplifying paths 3.1-3.6. ASIC 3 further comprises a second interface 3.7*b* in the form of a flattener interface for providing additional possibility of adjusting the flattening units 3.*xc* (frequency resonance and/or slope characteristics with external components).

As will be appreciated by a person skilled in the art, in this particular embodiment, ASIC 3 (or two ASICs in case of implementing only one set of amplifying paths per ASIC) is/are operating as slaves, the CPU being the master. Also, a data rate from the SPI bus 2.4 or an SPI bus clock should be kept as low as possible (few tens of KHz) to avoid noise from the digital blocks to interfere with the RF paths and degrade the RF performances.

ASIC 3 further comprises a temperature sensor 3.9, a test interface 3.10, multiplexing logic (or any other desired logic) 3.11, and a biasing structure 3.12 (bandgap/power management/voltage reference/current sources/ . . . ). The latter as well as LNAs 2.1, 2.2 and CPU 2.3 are connected with power supply unit 2.5 on LNA board 2. Biasing structure 3.12 will also provide biasing to LNAs 2.1, 2.2.

Furthermore, ASIC 3 comprises operating conditions measurement units 3.13, 3.14 in operative connection with LNA 3.*xa* and VGA 3.*xb* on each amplifying path 3.1-3.6. Furthermore, operating condition measurement units 3.13 and 3.14 are connected with SPI interface 3.8 or, alternatively, to a multiplexed output analog port (this is to prevent continuous request to the ASIC from CPU via SPI, to avoid unnecessary CPU processing and decrease risk of noise from the digital interface to the RF circuit).

During operation of antenna network circuit 1 comprising ASIC 3, a pair of parallel (technically) identical amplifying paths (3.1, 3.4) is activated in accordance with a desired RF bandwidth or standard. This is achieved by activating (biasing) at least one of the respective low noise amplifier 3.*xa*, attenuator unit 3.*xb*, and gain flattening unit 3.*xc* in each one of said pair of active amplifying paths 3.1, 3.4 by means of suitable control signals from CPU 2.3. Corresponding control commands are decoded in ASIC register 3.7 which is programmed so that the desired amplifying paths 3.1, 3.4 are biased while all other amplifying paths 3.2, 3.3, 3.5, 3.6 remain off. In the embodiment of FIG. 1 this can be achieved through suitable application software (not shown) embedded in CPU 2.3 and corresponding communication through SPI bus 2.4 and SPI interface 3.8. In this way, the desired ASIC amplifying paths 3.1, 3.4 are powered on. Furthermore, ASIC 3 provides biasing to the external LNAs 2.1, 2.2, which are powered on accordingly. By means of operating condition measuring units 3.13 and 3.14 operating conditions (e.g., bias conditions) of LNA 3.*xa* and VGA 3.*xb* are sensed internally within ASIC 3, and corresponding information is provided to CPU 2.3 through SPI interface 3.8 and SPI bus 2.4.

Figure 2:
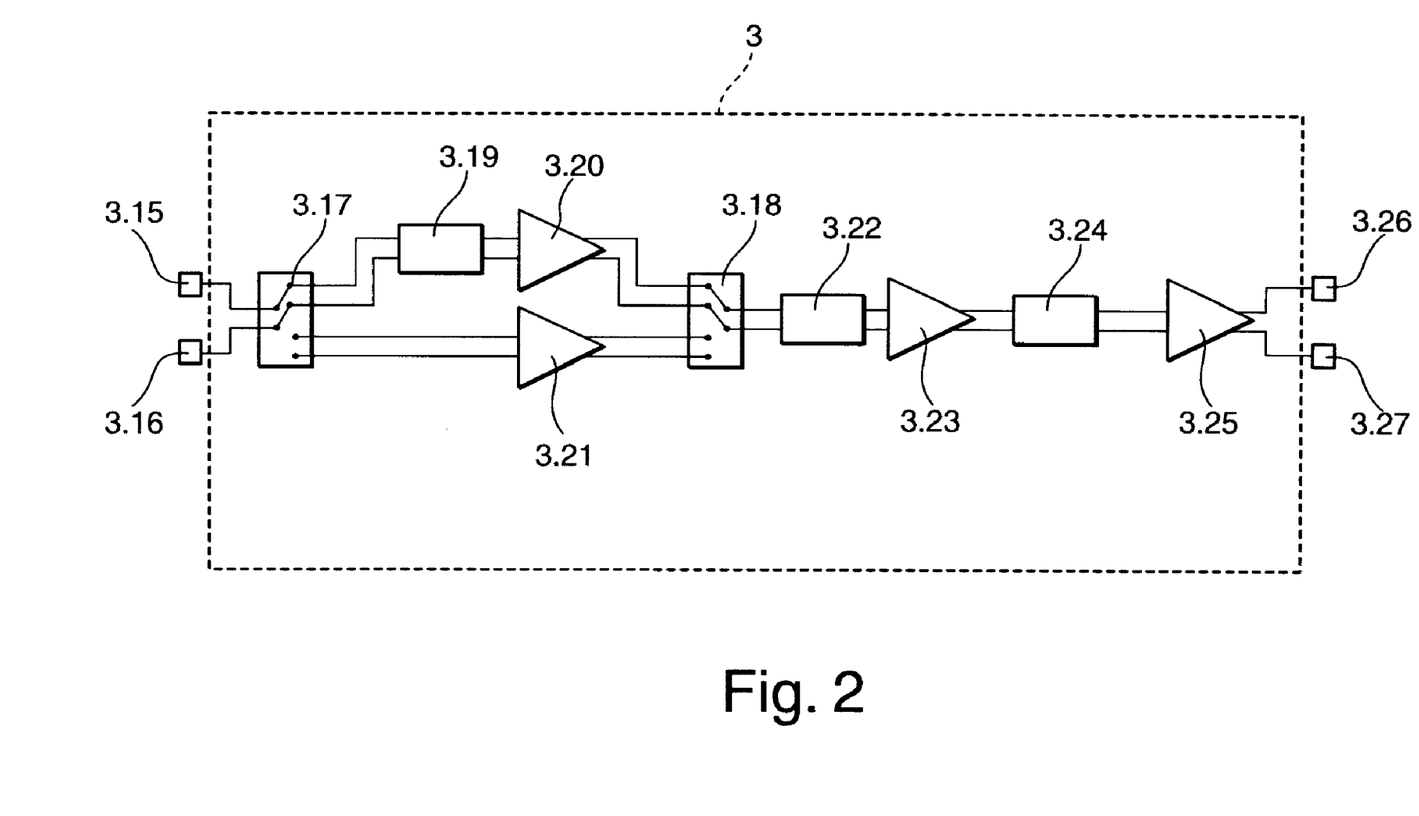
FIG. 2 is a schematic diagram of an embodiment of a radio frequency path in the integrated circuit in accordance with the present invention.

FIG. 2 shows a schematic diagram of an embodiment of a radio frequency path in the integrated circuit in accordance with the present invention. More specifically, FIG. 2 provides a detailed example of various embodiments of amplifying paths within ASIC 3, which correspond to one of amplifying paths 3.1-3.6 in FIG. 1. Generally, ASIC 3 comprises balanced inputs 3.15 and 3.16 for receiving RF antenna signals, either directly from a corresponding antenna (cf. reference numerals 4, 5 in FIG. 1) or from a preceding amplifying stage (cf. LNAs 2.1, 2.2 in FIG. 1). According to FIG. 2, the ASIC inputs 3.15, 3.16 are connected with a switching unit 3.17, e.g., an RF switch. Owing to a switching action of switching unit 3.17, inputs 3.15, 3.16 are either connected with a further switching unit 3.18 (e.g., an RF switch) via discrete attenuator unit 3.19 and LNA 3.20 or directly via LNA 3.21, thus forming two pairs of parallel (identical) amplifying paths between switching unit 3.17 and switching unit 3.18. Downstream of switching unit 3.18 ASIC 3 further comprises a variable attenuator unit 3.22, an LNA 3.23, a flattening unit 3.24, and a further LNA 3.25. Respective outputs of LNA 3.25 are connected with balanced outputs 3.26 and 3.27. Some or all of the elements 3.17-3.25 arranged between inputs 3.15, 3.16 and outputs 3.26, 3.27 of ASIC 3 according to FIG. 2 may be controllable by means of a digital control unit, e.g., CPU 2.3 of FIG. 1, either via control interface 3.7 (FIG. 1) following digital to analog conversion or directly by means of a digital processing unit, as will be described below with reference to appended FIG. 3. A balun (not shown), which is arranged externally of ASIC 3, can be used to input balanced signals to one of amplifying paths 3.1-3.6 (cf. FIG. 1).

As will be appreciated by a person skilled in the art, an RF amplifying path in accordance with embodiments of the integrated circuit of the present invention (e.g., according to FIG. 2) is built up using several elements or stages, e.g., low noise amplifiers, variable attenuators (active or passive), and flattening units. A precise internal architecture of ASIC 3 has to be defined in an application-specific manner according to performance requirements with respect to used frequency bands or standards and is by no means limited to the specific embodiment of FIG. 2. Furthermore, according to embodiments of the present invention it may be necessary in the implementation that some elements remain external, e.g., a front-end switch, or that the chip (i.e., ASIC 3) is connected to other external elements, e.g., baluns (impedance transformers), inductors, . . . to improve performance characteristics that could be too limited when relying solely on a BiCMOS process.

If a noise figure of the ASIC 3 or the ASIC specification in general is compliant with a given application, then ASIC 3 may be operational without an external LNA (e.g., LNAs 3.1, 3.2 of FIG. 1), as already stated above.

Figure 3:
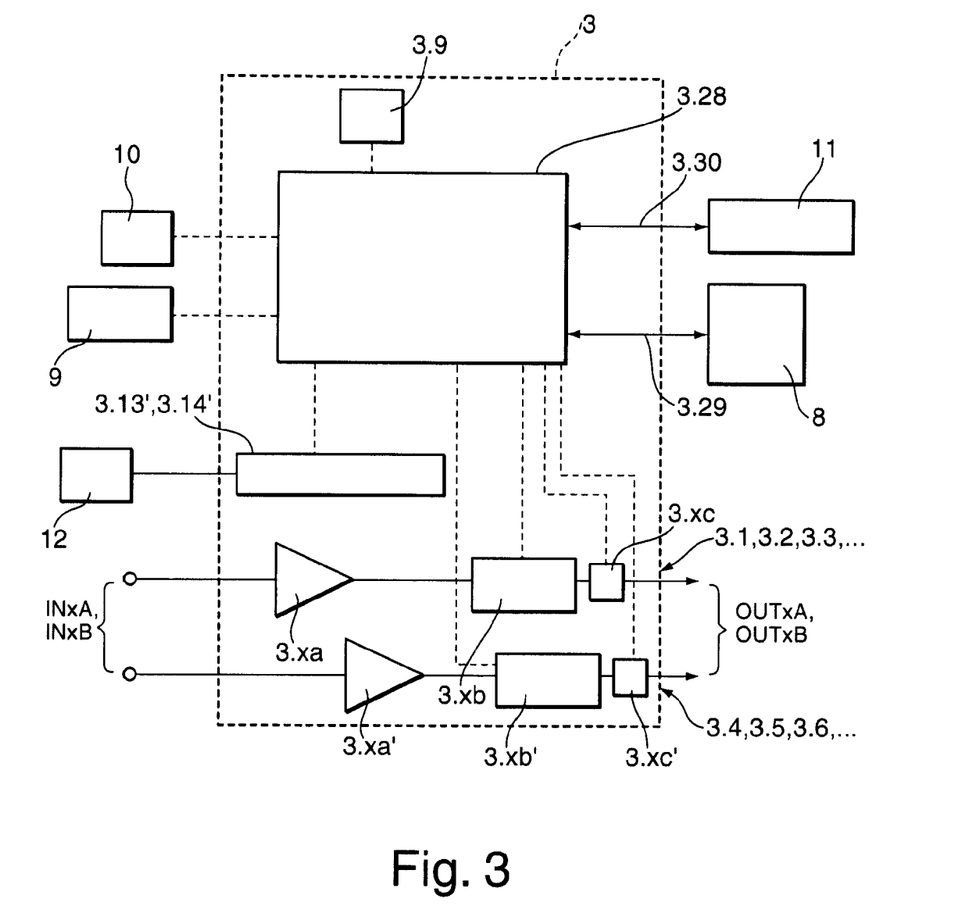
FIG. 3 is a schematic diagram providing an architecture overview of another embodiment of the antenna network circuit and integrated circuit in accordance with the present invention.

FIG. 3 shows a schematic diagram providing an architecture overview of another embodiment of the antenna network circuit 1 and integrated circuit 3 in accordance with the present invention. According to the embodiment of FIG. 3, ASIC 3 is devised as a mixed-mode ASIC comprising digital processing unit 3.28, the function of which generally corresponds to that of CPU 2.3 in FIG. 1. The digital processing unit 3.28 of FIG. 3 is operatively connected with integrated or internal temperature sensor 3.9 as well as with various other elements arranged externally of ASIC 3, i.e., an external memory unit 8, in particular an electrically programmable memory type (EEPROM), e.g., a flash memory, a debug tracer 9, e.g., in form of a JTAG (Joint Test Action Group) debug tracer, signalling elements 10, e.g., light-emitting diodes (LEDs), and others which are generally denoted by reference numeral 11, e.g., an I²C control bus for providing communication between different integrated circuits, an SPI bus, a UART (Universal Asynchronous Receiver Transmitter), general purpose input/output pins (GPI/O), or the like. Memory unit 8 is connected with digital processing unit 3.28 through address and data bus 3.29 while said other elements 11 are connected with digital processing unit 3.28 through suitable interfaces 3.30, as known to a person skilled in the art.

The other elements comprised within ASIC 3 of FIG. 3 have already been described with reference to appended FIG. 1 so that a detailed description thereof will be omitted. These other elements include a plurality of amplifying paths 3.1-3.6, . . . only two of which are shown for reason of clarity. As already described above with reference to appended FIGS. 1 and 2 the amplifying paths 3.1-3.6, . . . each comprise at least one low noise amplifier 3.xa, 3.xa' followed by a variable attenuator 3.xb, 3.xb', and a flattening unit 3.xc, 3.xc'. Operation at least of LNAs 3.xa, 3.xa' is monitored by means of LNA alarm detector 3.13', 3.14' the function of which generally corresponds to that of operating conditions measurement unit 3.13, 3.14 as previously described with reference to appended FIG. 1. LNA alarm detector 3.13', 3.14' is connected with digital processing unit 3.28 for control purposes, i.e., controlling operation of LNAs 3.xa, 3.xa', and with a further signalling unit 12, e.g., a bi-colour LED, arranged externally of ASIC 3 for signalling any alarm condition of LNAs 3.xa, 3.xa'.

In this way, the embodiment of FIG. 3 represents a mixed-mode or mixed-signal ASIC 3 as a further option falling under the scope of the present invention. As previously described, ASIC features include—taking into account a further LNA stage 2.1, 2.2 on LNA board 2 (cf. FIG. 1)—second and possibly more LNA stages, variable attenuators, gain flatteners, CPU functions (µC functions), temperature sensing functions, as well as VSWR-MPX (Voltage Standing Wave Ratio/Multiplex) logic (not shown in FIG. 3). Using an external memory unit 8 enhances cost effectiveness and serves for downloading application data for a current RF bandwidth or standard supported by ASIC 3.

In contrast to this, it will be appreciated by a person skilled in the art, the embodiment described above with reference to appended FIG. 1 does not provide all-in-one integration but encompasses separate chips, e.g., CPU 2.3 and ASIC 3, with the digital processing unit left on board. Such an embodiment can be regarded as an analog device including a digital interface to the digital processing unit or microcontroller (µC). In this case ASIC features include second and possibly further (cf. FIG. 2) LNA stages, variable attenuators, gain flatteners, temperature sensing functions, current sensing functions (for LNA alarm), SPI interfaces to the µC for all communication (e.g., temperature compensation, gain and flatness control, . . . ), VSWR-MPX logic, etc. As with the solution of FIG. 3, there can be a first LNA stage on board to achieve a desired performance.

In an alternative embodiment, which is not represented in the figures, ASIC 3 may be devised as an analog device with an analog interface for analog interface signals to the µC, which is located on board, i.e., externally of the ASIC, as previously described with reference to appended FIG. 1. In this case, the design of the ASIC is generally similar to that of the analog device including a digital interface to the µC, with the exception that there is no SPI interface. Suitable control signal buffers (not shown) should then be located on board, e.g., LNA board 2 (FIG. 1). A drawback of this last solution being the increased number of ASIC input/output signals.

Figure 4:
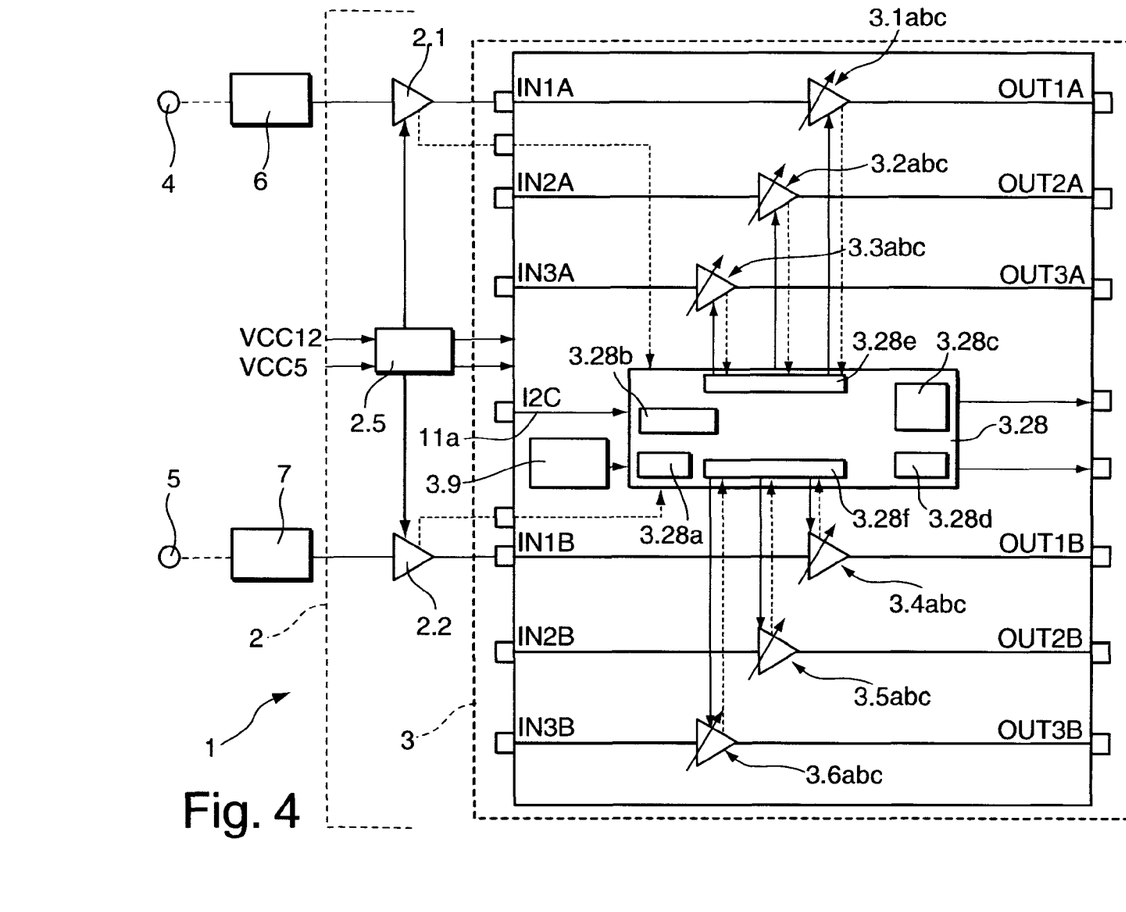
FIG. 4 is a more detailed schematic diagram of the antenna network circuit and integrated circuit of FIG. 3.

FIG. 4 shows a more detailed schematic diagram of the antenna network circuit and integrated circuit of FIG. 3. The representation of the embodiment of FIG. 4 is somewhat similar to that of the previously described FIG. 1, and the same or similar elements are denoted by means of the same reference numerals. A detailed description of these elements will be omitted. Note that in FIG. 4, the different functional elements arranged on each amplifying path 3.1-3.6, which are represented as separated entities 3.xa-c in FIG. 1, have been illustrated by means of a single respective unified symbol 3.xabc.

As previously described with reference to appended FIG. 3, ASIC 3 comprises the digital processing unit 3.28 in operative connection with interface 3.30 configured as an I²C bus. Furthermore, ASIC 3 (i.e., digital processing unit 3.28) may be operatively connected with an external memory unit (not shown in FIG. 4), e.g., through a serial or parallel bus interface, as depicted at 3.29 in FIG. 3.

The digital processing unit 3.28 is connected with the temperature sensor 3.9 as well as with on-board LNAs 2.1, 2.2 for operating conditions monitoring (e.g., current or voltage sensing). To this end, the digital processing unit 3.28 comprises an analog-to-digital converter 3.28*a*. In operative connection with I²C bus 11*a* the digital processing unit 3.28 further comprises a configurable port 3.28*b*. Furthermore, digital processing unit 3.28 comprises GPI/O and PWM (pulse width modulation) unit 3.28*c* for controlling signalling unit 10 of FIG. 3 and JTAG unit 3.28*d* for communication with debug tracer 9 of FIG. 3. The digital processing unit 3.28 further comprises digital control interfaces 3.28*e*, 3.28*f* for communication with, i.e., for controlling operation of amplifying path elements 3.*xabc*. In other words, according to the embodiment of FIG. 4 said amplifying path elements 3.*xabc* (x=1, . . . , 6) are devised for digital control by means of internal digital processing unit 3.28, e.g., for temperature compensation, gain and flatness control, etc.

As will be appreciated by a person skilled in the art, the present invention is by no means limited to the described exemplary embodiments, element or features of which can be combined and exchanged as long as the resulting embodiments fall under the scope of the appended patent claims. In particular, further elements of ASIC 3 depicted in FIG. 1, e.g., MPX logic 3.11, power management 3.12, test interface 3.10, or flattener interface 3.8 as well as corresponding input/output connectors can also be present in connection with the embodiment of FIG. 4 although they are not explicitly represented therein for reason of clarity.

As previously described with reference to appended FIG. 1, in the embodiments of FIG. 3 and FIG. 4 one pair of parallel/identical amplifying paths 3.1-3.6, for instance amplifying path 3.1 and amplifying path 3.4, are activated (i.e., powered on and suitably biased) by means of corresponding commands issued by digital processing unit 3.28. The other amplifying paths remain powered off. On-board LNAs 2.1, 2.2 are biased and powered on accordingly.

In all of the embodiments described so far, activation of a suitable pair of amplifying paths is preferably programmed and set up prior to putting the antenna network circuit 1 comprising LNA board 2 and ASIC 3 into operation, e.g., in a base station of a cellular telecommunication network. In other words, there is no dynamic adaptation of the antenna network circuit 1 to changing RF bandwidths or standards. However, this latter approach is not excluded from the present invention.

It should further be noted that although the present invention has been described by means of embodiments showing a plurality of parallel (identical) amplifying paths for reason of diversity reception, the present invention is not restricted to such an embodiment. In other words, the basic concept of the present invention, i.e., having a plurality of amplifying paths dedicated to different frequency bands or standards, the elements of which are arranged for control by means of a digital processing unit, or by means of a digital interface to said digital processing unit, does not require parallel (identical) amplification paths. However, the latter feature may be required in the context of some standards (e.g., GSM), and the ASIC 3 may be designed accordingly (cf. FIGS. 1 and 4). However, within the scope of the present invention, the same configuration could be achieved by combining two ASICs in accordance with the present invention, wherein each ASIC only comprises one set of amplifying paths. Referring again to the embodiments of FIG. 1 and FIG. 4, this would correspond to a first ASIC comprising amplifying paths 3.1-3.3 and to a second ASIC comprising amplifying paths 3.4-3.6. These ASICs could be coupled with a single digital processing unit (CPU 2.3 of FIG. 1) by means of a digital interface, the ASICs operating as slaves and the CPU being the master. The two options then are either 1) providing a plurality of RF paths (amplifying paths) together with a digital interface (thus forming an ASIC), and using this ASIC twice with one external CPU or 2) providing RF paths which are integrated twice for diversity and including the CPU as well (digital processing unit 3.28 of FIG. 4).

Figure 5:
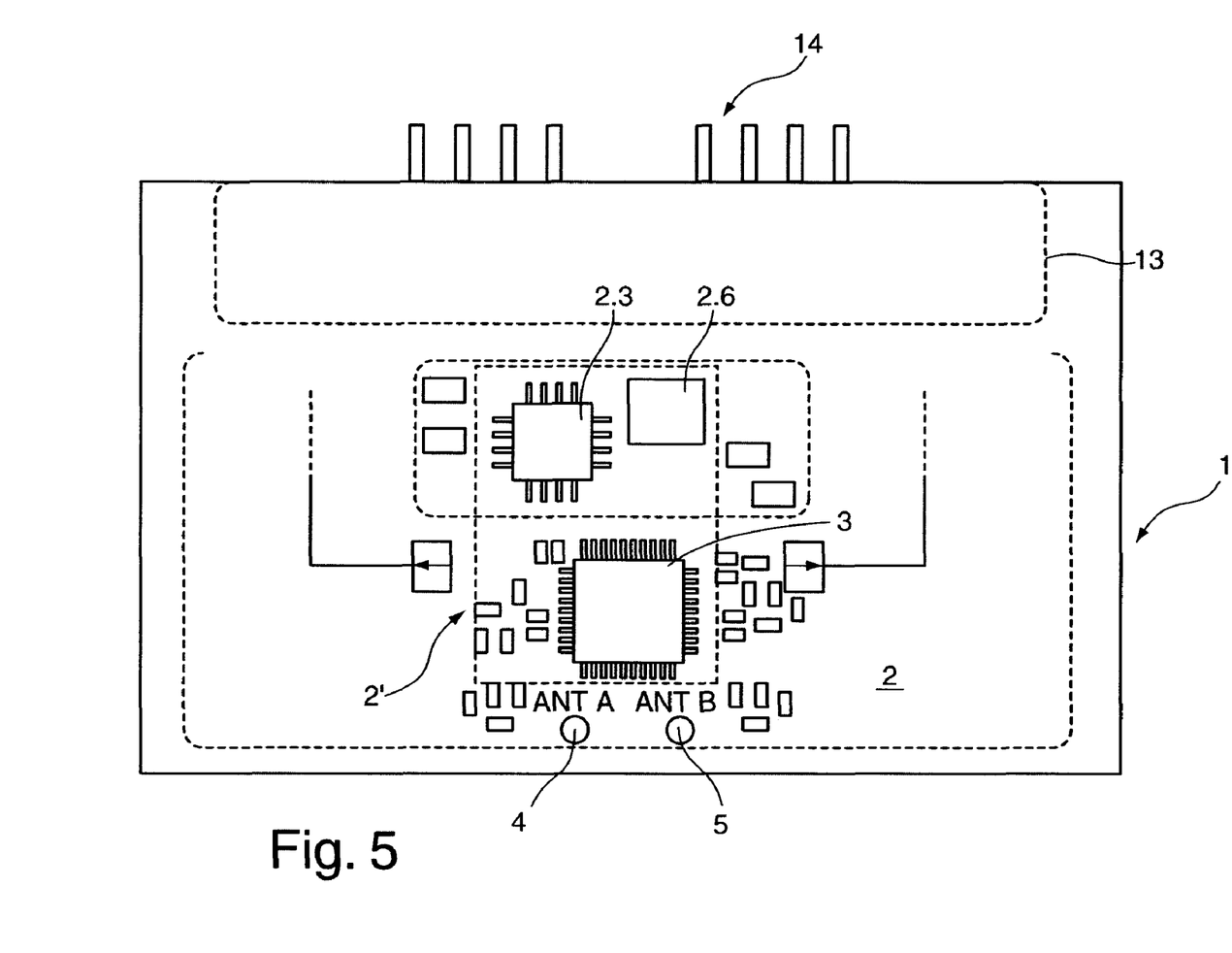
FIG. 5 is a schematic diagram of a multi chip design comprising embodiments of the antenna network circuit and the integrated circuit in accordance with the present invention.
Figure 6:
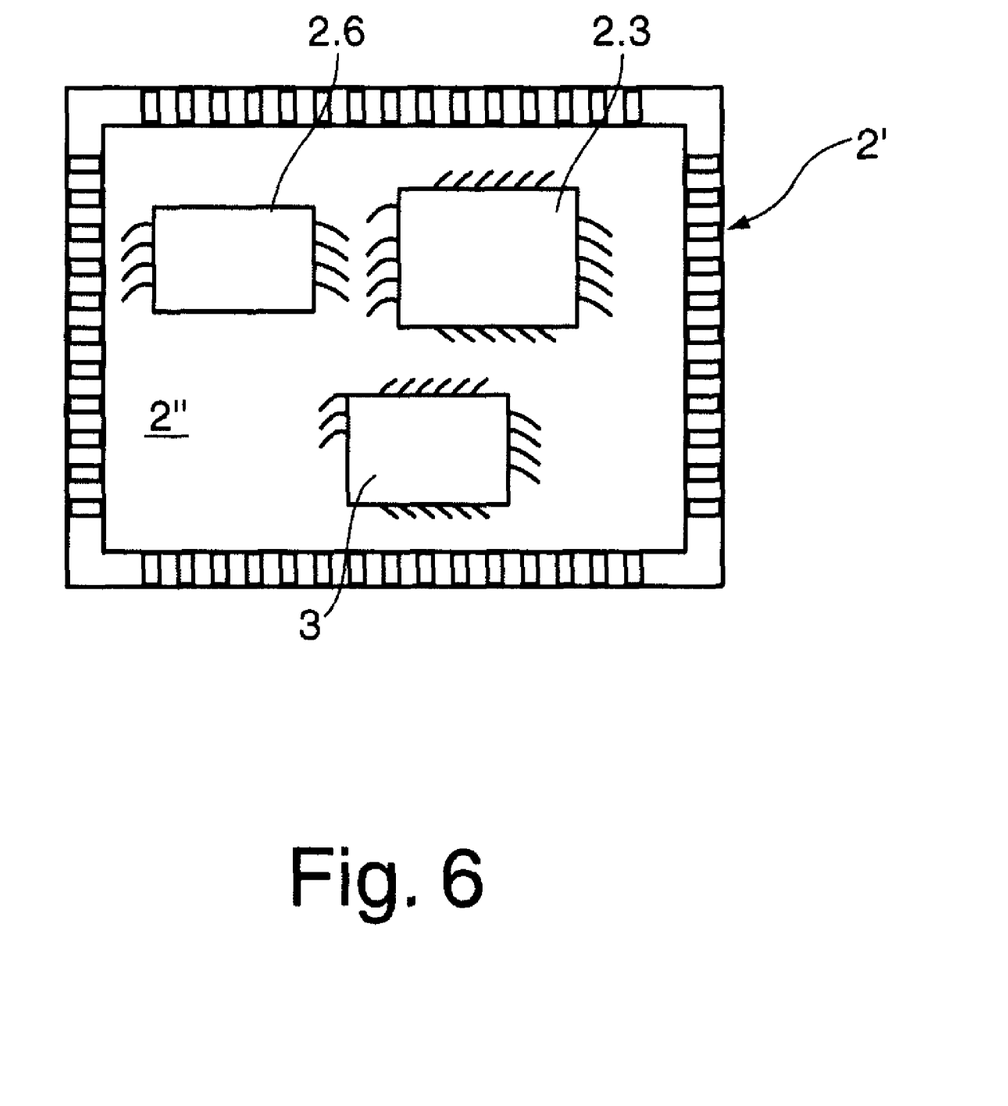
FIG. 6 is a schematic diagram of a multi-chip module (MCM) comprising embodiments of the antenna network circuit and the integrated circuit in accordance with the present invention.

FIG. 5 shows a schematic diagram of a multi chip comprising embodiments of the antenna network circuit and the integrated circuit in accordance with the present invention, and FIG. 6 shows a schematic diagram of a multi-chip module (MCM) comprising embodiments of the antenna network circuit and the integrated circuit in accordance with the present invention.

FIG. 5 illustrates a multi-chip solution in general accordance with the concept illustrated in previously described FIG. 1, i.e., ASIC 3 is not devised for mixed-mode or mixed-signal operation but in form of a dedicated RF chip. ASIC 3 is arranged on LNA board 2 together with digital processing unit (CPU) 2.3. In contrast to the previously described embodiments, the temperature sensor is devised as a separate entity 2.6 arranged on LNA board 2. ASIC (RF chip) 3, CPU 2.3, and temperature sensor 2.6, all of which can be devised as separate packaged chips, can be regarded as providing an LNA function within antenna network circuit 1. Said LNA function is illustrated by means of a dashed box 2' in FIG. 5. Output signals from LNA board 2 (LNA function 2') are provided to an RF splitter 13 and RF outputs 14 for further use in an entity comprising the antenna network circuit 1, for instance a base station of a cellular telecommunication network.

A description of further elements present on LNA board 2 of FIG. 5, which are used, e.g., for power supply regulation or the like, will be omitted since they do not form part of the present invention.

Preferably, as shown in appended FIG. 6, the LNA function 2' of FIG. 5 can be achieved by providing a multi-chip module (MCM) combing the RF chip (RF die), i.e. ASIC 3, the CPU chip (CPU die) 2.3, and the sensor chip (sensor die) 2.6 in a single module. The CPU bare die 2.3 as well as the analog device bare dies 3, 2.6 are arranged on a suitable substrate 2'', for instance a ceramic material.

In this way, a solution in accordance with the present invention is built up using a CPU bare die as well as a number of analog device bare dies in accordance with previously described embodiments of the present invention. In this way, the LNA function 2' can be provided in space-saving fashion allowing for easily on-board integration.

The invention claimed is:

1. An integrated circuit, IC, for reception of radio frequency; RF, signals in an antenna network system, the IC comprising:
    at least two parallel amplifying paths, each parallel amplifying path facilitating diversity reception of a desired radio frequency bandwidth or standard, each amplifying path connecting a unique input of the IC with a corresponding unique output of the IC, each amplifying path comprising at least one low noise amplifier, at least one variable attenuator unit, and/or at least one gain flattening unit for flattening the gain in the frequency domain, each of the low noise amplifier, the variable attenuator unit, and the gain flattening unit of the respective amplifying path being adapted to operate at the respective radio frequency bandwidth or standard associated with the parallel amplifying path with which the respective amplifying path is associated;

at least one control interface connected with at least one of the low noise amplifier, the variable attenuator unit, and the gain flattening unit on each amplifying path and adapted for communication with a digital processing unit to control operation of the at least one of the low noise amplifier, the variable attenuator unit, and the gain flattening unit for the corresponding amplifying path.

2. The integrated circuit of claim 1, further comprising the digital processing unit.

3. The integrated circuit of claim 1 wherein, during operation, the amplifying paths of a parallel amplifying path associated with a desired radio frequency bandwidth or standard are activated by activating at least one of the low noise amplifiers in the corresponding amplifying paths and the amplifying paths associated with other radio frequency bandwidths or standards remain off.

4. The integrated circuit of claim 1 wherein at least one of the low noise amplifier, the variable attenuator unit, and the gain flattening unit on each amplifying path is adapted for digital control by the digital processing unit.

5. The integrated circuit of claim 1 wherein at least one of the low noise amplifier, the variable attenuator unit, and the gain flattening unit on each amplifying path is adapted for analog control by the digital processing unit through a digital-to-analog converting unit.

6. The integrated circuit of claim 1 wherein a programmable memory unit operates in connection with the digital processing unit and the at least one control interface to bias the amplifying paths associated with a desired radio frequency bandwidth or standard for reception of RF signals.

7. An antenna network circuit comprising
the integrated circuit according to claim 1; and
a first amplifier stage having a pair of first stage low noise amplifiers, said first amplifier stage being connected with the integrated circuit so that the first stage low noise amplifiers are respectively connected with first and second amplifying paths of an active parallel amplifying path in the integrated circuit for a desired radio frequency bandwidth or standard.

8. The antenna network circuit of claim 7, further comprising:
an external memory unit, in particular a programmable memory unit, in particular a Flash memory unit, that operates in connection with the digital processing unit and the at least one control interface to control the amplifying paths in the integrated circuit; and/or
the digital processing unit, wherein the digital processing unit is arranged externally of the integrated circuit.

9. Base station for a cellular telecommunications system, the base station comprising
the antenna network circuit according to claim 7.

10. A method for reception of antenna signals, the method comprising:
receiving a radio frequency, RF, antenna signal associated with a desired radio frequency (RF) bandwidth or standard via diversity reception at an integrated circuit (IC),
selectively providing said RF antenna signal to each amplifying path of a parallel amplifying path selected from a plurality of parallel amplifying paths, each parallel amplifying path associated with a different RF bandwidth or standard, the select parallel amplifying path and each of said select amplifying paths covering the desired RF bandwidth or standard associated with the received RF antenna signals, each amplifying path connecting a unique input of the IC with a corresponding unique output of the IC via at least one low noise amplifier, at least one variable attenuator unit, and/or at least one gain flattening unit for flattening the gain in the frequency domain, each of the low noise amplifier, the variable attenuator unit, and the gain flattening unit of the respective amplifying paths being adapted to operate at the respective RF bandwidth or standard associated with the parallel amplifying path with which the respective amplifying path is associated, and controlling gain and/or flatness of each amplifying path by means of a digital processing unit through at least one control interface connected with the corresponding amplifying path.

11. The method set forth in claim 10, further comprising:
activating select amplifying paths by activating at least one of the low noise amplifiers in the corresponding select parallel amplifying path, wherein each amplifying path in parallel amplifying paths associated with other RF bandwidths or standards remains off.

12. The method set forth in claim 10, further comprising:
biasing at least one of the low noise amplifiers in the select parallel amplifying path to activate the corresponding select amplifying paths of the select parallel amplifying path, wherein each amplifying path in parallel amplifying paths associated with other RF bandwidths or standards remains off.

13. An integrated circuit (IC) for diversity reception of radio frequency (RF) signals, comprising:
parallel amplifying paths for each of a plurality of RF bandwidths or standards, each parallel amplifying path comprising first and second amplifying paths to facilitate diversity reception of RF signals associated with the corresponding RF bandwidth or standard, each amplifying path connecting a unique input of the IC with a corresponding unique output of the IC through at least one low noise amplifier, at least one variable attenuator unit, and at least one gain flattening unit, each gain flattening unit for flattening the gain in the frequency domain for the corresponding RF bandwidth or standard, each of the low noise amplifier, the variable attenuator unit, and the gain flattening unit of the respective amplifying path being adapted to operate at the respective RF bandwidth or standard associated with the parallel amplifying path with which the respective amplifying path is associated;

at least one control interface device connected with at least one of the low noise amplifier, the variable attenuator unit, and the gain flattening unit on each amplifying path and adapted for communication with a digital processing unit to control operation of the corresponding amplifying path via the at least one control interface device.

14. The integrated circuit (IC) set forth in claim 13 wherein the digital processing unit is within the IC.

15. The integrated circuit (IC) set forth in claim 13 wherein, during operation, the first and second amplifying paths of a select parallel amplifying path associated with a desired RF bandwidth or standard are activated by activating at least one of the low noise amplifiers in either the first or second amplifying paths of the select parallel amplifying path and the amplifying paths associated with other RF bandwidths or standards remain off.

16. The integrated circuit (IC) set forth in claim 13 wherein the low noise amplifiers, variable attenuator units, and gain flattening units of the amplifying paths are adapted for digital control by the digital processing unit.

17. The integrated circuit (IC) set forth in claim 13 wherein the low noise amplifiers, variable attenuator units, and gain flattening units of the amplifying paths are adapted for analog control by the digital processing unit through a digital-to-analog converting unit.

18. The integrated circuit (IC) set forth in claim 13 wherein a programmable memory unit operates in connection with the digital processing unit and the at least one control interface device to bias the first and second amplifying paths of a parallel amplifying path associated with a desired radio frequency bandwidth or standard for reception of RF signals.

19. The integrated circuit (IC) set forth in claim 13, further comprising:
    a first control interface device in operative communication with the digital processing unit and serving as a decoder/multiplexer to control operation of the variable attenuator units and gain flattening units in relation to power on, temperature compensation, gain, and flattening control.

20. The integrated circuit (IC) set forth in claim 19, the first control interface further comprising:
    a digital-to-analog converter for converting digital control signals from the digital processing unit to analog control signals for controlling the variable attenuator units and gain flattening units.

\* \* \* \* \*